US009665625B2

(12) United States Patent
Reiss et al.

(10) Patent No.: US 9,665,625 B2
(45) Date of Patent: May 30, 2017

(54) MAXIMIZING THE INFORMATION CONTENT OF SYSTEM LOGS

(71) Applicant: International Business Machines Corporation, Armonk, NY (US)

(72) Inventors: Frederick R. Reiss, Sunnyvale, CA (US); Saeed Ghanbari, New Haven, CT (US); Prithviraj Sen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/314,195

(22) Filed: Jun. 25, 2014

(65) Prior Publication Data
US 2015/0379008 A1 Dec. 31, 2015

(51) Int. Cl.
*G06F 17/30* (2006.01)

(52) U.S. Cl.
CPC .. *G06F 17/30501* (2013.01); *G06F 17/30368* (2013.01)

(58) Field of Classification Search
CPC ............. G06F 21/64; G06F 17/30153; G06F 11/1471; G06F 17/3033; G06F 17/30876; G06F 17/30501; G06F 17/30368; H04L 9/3236; H04L 9/3223; H04L 9/3242; H03M 7/30
See application file for complete search history.

(56) References Cited

U.S. PATENT DOCUMENTS

| 6,769,079 B1* | 7/2004 | Currey | G06F 11/0709 709/224 |
| 7,185,089 B2 | 2/2007 | Satomi et al. | |
| 7,448,039 B2 | 11/2008 | Green et al. | |
| 8,407,335 B1* | 3/2013 | Church | G06F 11/0709 709/218 |
| 9,143,393 B1* | 9/2015 | Bird | H04L 41/046 |
| 2007/0165625 A1* | 7/2007 | Eisner | G06F 9/546 370/389 |
| 2008/0152235 A1* | 6/2008 | Bashyam | G06F 17/30153 382/224 |
| 2010/0088512 A1* | 4/2010 | Schwartz | G06F 17/3089 713/168 |

(Continued)

OTHER PUBLICATIONS

Vitter, Jeffrey; "Random Sampling with a Reservoir"; Brown University; ACM Transactions on Mathematical Software; vol. 11; No. 1; Mar. 1985; pp. 37-57; Copyright 1985 ACM.

*Primary Examiner* — Merilyn Nguyen
(74) *Attorney, Agent, or Firm* — Nicholas L. Cadmus

(57) ABSTRACT

In a method for maximizing information content of logs, a log message from an executing software program is received. The log message includes a timestamp, a source code location ID, a session ID, and a log message text. The timestamp, the source code location ID, and the session ID of the log message are stored in a lossless buffer. A hash function value of the session ID is determined. It is determined that the hash function value of the session ID is less than a hash value threshold. The log message text is stored in a session buffer in response to determining that the hash function value of the session ID is less than the hash value threshold, wherein the session buffer contains log message texts of log messages with corresponding hash function values less than the hash value threshold.

13 Claims, 4 Drawing Sheets

(56) References Cited

U.S. PATENT DOCUMENTS

| | | | |
|---|---|---|---|
| 2010/0088517 A1* | 4/2010 | Piersol | H04L 9/3236 |
| | | | 713/171 |
| 2010/0088522 A1* | 4/2010 | Barrus | G06F 21/64 |
| | | | 713/181 |
| 2011/0296244 A1* | 12/2011 | Fu | G06F 11/3608 |
| | | | 714/37 |
| 2013/0031086 A1* | 1/2013 | Strelec | G06F 17/30539 |
| | | | 707/722 |
| 2015/0331913 A1* | 11/2015 | Borowiec | H03M 7/3079 |
| | | | 707/693 |

* cited by examiner

MAXIMIZING THE INFORMATION CONTENT OF SYSTEM LOGS

FIELD OF THE INVENTION

The present invention relates generally to the field of large-scale data analysis, and more particularly to dataset reduction, analysis, and session tracking.

BACKGROUND OF THE INVENTION

A system log is a file that records either the events which happen while an operating system or other software runs, or the personal messages between different users of a communication software or a multiplayer game. The act of keeping a log file is called logging. In the simplest case, log messages are written to a single log file. Additionally, an event log record events taking place in the execution of a system in order to provide an audit trail that can be used to understand the activity of the system and to diagnose problems. Event logs aid administrators to understand the activities of complex systems, particularly in the case of applications with little user interaction (such as server applications). System logs can be used for computer system management and security auditing as well as generalized informational, analysis, and debugging messages.

System administrators have a dilemma as to setting the proper level of system logging. For instance, outputting too few messages prevents using diagnostic software to determine the causes of errors. Conversely, having an application constantly storing too many messages will put unnecessary load on storage, CPU, and network resources, potentially harming the performance and availability of the system.

SUMMARY

Aspects of embodiments of the present invention disclose a method, computer program product, and computer system for maximizing information content of logs. In one embodiment, a method includes one or more processors receiving a first log message from an executing software program, wherein the first log message includes a first timestamp, a first source code location ID, a first session ID, and a first log message text. The method further includes one or more processors storing the first timestamp, the first source code location ID, and the first session ID of the first log message in a first lossless buffer. The method further includes one or more processors determining a hash function value of the first session ID. The method further includes one or more processors determining that the hash function value of the first session ID is less than a hash value threshold. The method further includes, in response to determining that the hash function value of the first session ID is less than the hash value threshold, one or more processors storing the first log message text in a session buffer, wherein the session buffer contains log message texts of log messages with corresponding hash function values less than the hash value threshold.

DETAILED DESCRIPTION

The present invention will now be described in detail with reference to the Figures. The following Figures provide an illustration of one embodiment. The embodiment, taken in part or in whole, does not imply any limitations with regard to the environments in which different embodiments may be implemented.

Figure 1:
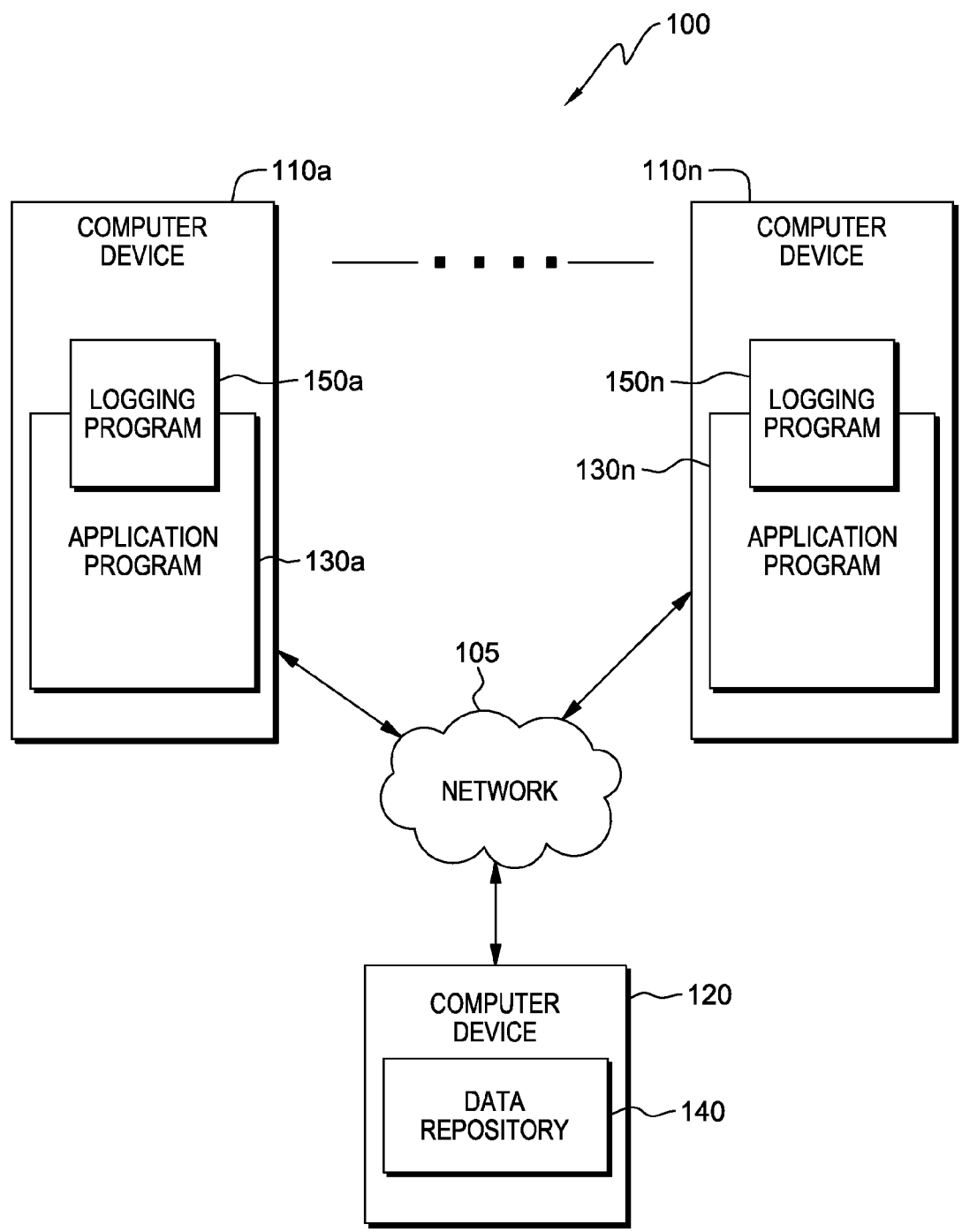
FIG. 1 is a diagram of a computer network infrastructure, in accordance with one embodiment of the present invention.

FIG. 1 is a diagram of computer network infrastructure 100, in accordance with one embodiment of the present invention. Computer network environment 100 includes computer devices 110a-110n and computer device 120, all interconnected over network 105. Network 105 may be a local area network (LAN), a wide area network (WAN) such as the Internet, any combination thereof, or any combination of connections and protocols that will support communications among computer devices 110a-110n and computer device 120, in accordance with embodiments of the invention. Network 105 may include wired, wireless, or fiber optic connections. Computer network environment 100 may include additional computers or other devices not shown.

In various embodiments, one computer device replicates all embodiments of computer devices 110a-110n and computer device 120 into the one computer device and are possibly connected to other computer devices (not shown). In other embodiments, computer devices 110a-110n and computer device 120 communicate to other computers on network 105 in a peer-to-peer fashion, where all computers share equivalent responsibility for processing data. In other embodiments, computer devices 110a-110n and/or computer device 120 may represent a server computing system utilizing multiple computers as a server system, such as in a cloud computing environment. In various embodiments, computer devices 110a-110n are known as "computer nodes" or "worker nodes."

In one embodiment, application programs 130a-130n are a distributed system, for example a flight booking application. The distributed system includes all of application programs 130a-130n combined, and it is this distributed system that is being monitored by generating logs. In practice, an application program may be several software process and software threads, each of which can, generate a message log. Hereinafter, software process, threads, functions, and modules of the application program shall be referred to as an "application component." In some embodiments, the distributed system is known as "the system under test."

Data repository 140 is a data storage node in which all log messages, compressed or uncompressed, are stored. Access to data repository 140 through computer device 120 and may involve any suitable application communications mechanisms, as someone skilled in the arts would recognize. In one embodiment, data repository 140 can be in the form of a: (i) database; (ii) flat file; (iii) or any structure that would facilitate access and security of such information. The information within data repository 140 is obtainable through methods, whether custom or off-the-shelf, that facilitate access by authorized users. For example, such methods include, but are not limited to, a database management system (DBMS).

Figure 2:
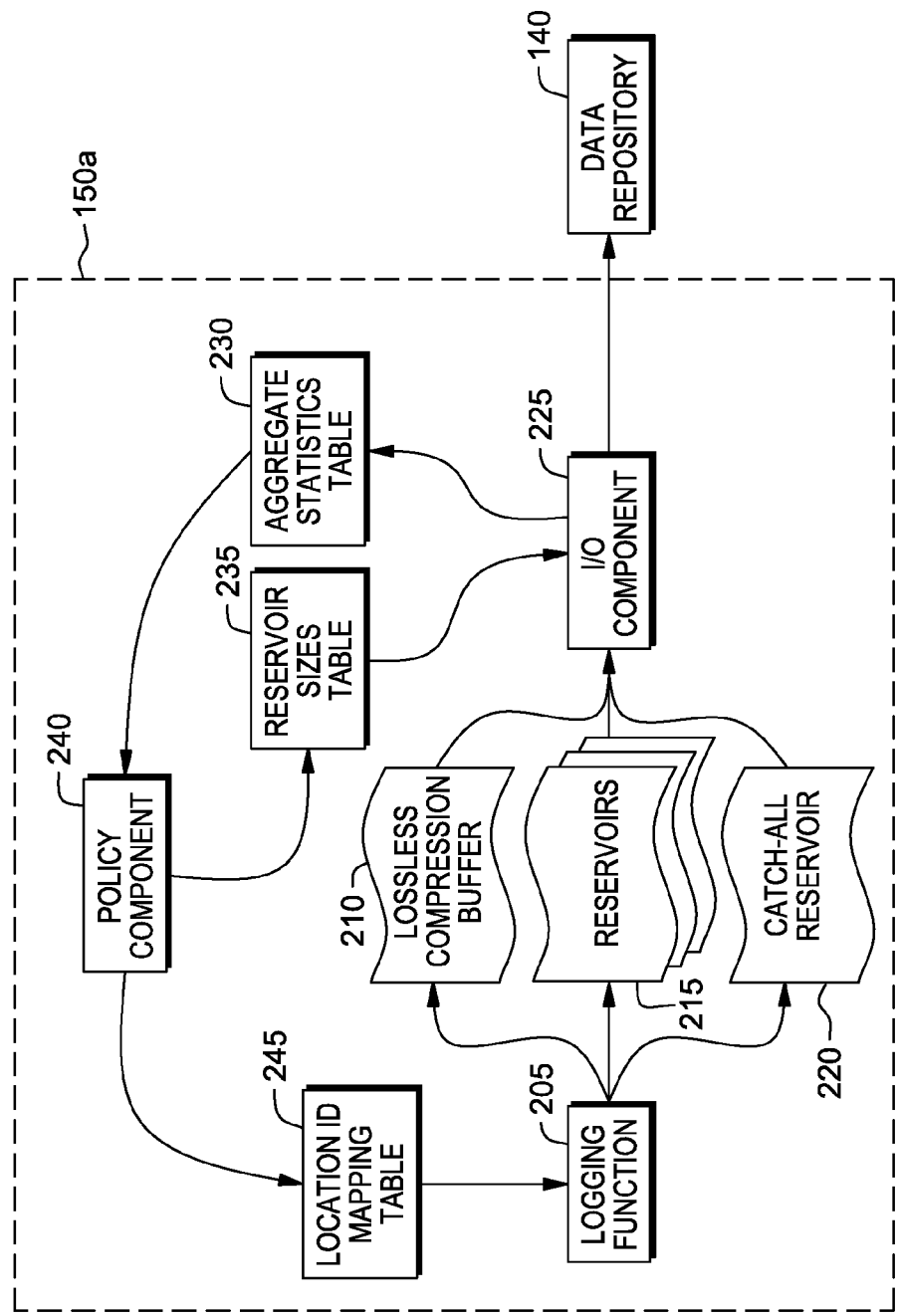
FIG. 2 depicts relationships among components that comprise a logging program of FIG. 1, in accordance with one embodiment of the present invention.

Each of logging programs 150a-150n is a pluggable library, such as an application programming interface, which is called whenever a log message is generated by a component of the respective application program 130. The interface between a logging program 150 and application component that is generating the log message is a logging function, such as logging function 205 as shown in FIG. 2. From the perspective of the distributed system, the application component is simply calling the logging function whenever the application component wants to write a log message.

FIG. 2 depicts relationships among components that comprise an instance of logging programs 150a-150n, logging program 150a, in accordance with one embodiment of the present invention. Logging program 150a contains logging function 205, lossless compression buffer 210, reservoirs 215, catch-all reservoir 220, I/O component 225, aggregate statistics table 230, reservoir sizes table 235, policy component 240, location ID mapping table 245, and data repository 140. Embodiments of the invention support the ability to perform at least two kinds of analytics within application programs 130a-130n: creating process models and computing aggregate statistics about individual locations.

Within a distributed system, execution of an end-to-end transaction typically takes a relatively fixed path through the system. For example, referring again to the example of a flight booking application, a user may click a button in their web browser, and that action of clicking a button cascades a set of actions on a back-end server. Typically, the cascade of actions are going to be the same actions over and over; if a number different users click the same button, the back-end sever is going to execute roughly the same path for everyone. By building a process model that describes this common path, an analyst can perform important system management tasks such as detecting anomalous behavior or analyzing end-to-end transaction latency. Since the same log messages appear again and again, across many sessions, embodiments only need to retain all of the log records for only a subset of the sessions. Consequently, by setting a session ID threshold, embodiments of the invention ensure that, for some percentage of the end-to-end sessions, a sample of 100% of the log records is retained. It is the job of policy component 240 to set the session ID threshold, such that there is enough space to retain the 100% sample. Nevertheless, if lossless compression buffer 210 does fill up, it will gracefully degrade as it is simply storing a sample of the log traffic in the current time window.

Individual locations within application program 130a-130n are kept to determine further statistics. For example, to determine the total number of bytes transmitted from one application component of the distributed system to another, either each distinct event needs to be collected or a sufficient number of transmitting data events needs to be collected in order to provide an accurate estimate of the number of bytes transmitted.

Logging function 205 is a routine called from multiple components of application program 130. Each application component makes repeated calls to logging function 205, such as from multiple different threads of execution. In the depicted embodiment, logging function 205 is reentrant; however, in other embodiments, logging function 205 can be implemented differently, as long as multiple functions can call logging function 205 simultaneously. Logging function 205 takes four arguments: a current real-time timestamp, a source code location ID, a session ID, and a log message text.

The current real-time timestamp is generated by logging function 205 by accessing the system clock. In other embodiments, the current real-time timestamp is provided by the calling application component. The source code location ID is a sequence of bytes that uniquely identifies each location in application program 130's source code from which a call to logging function 205 occurs. In one embodiment, the source code location ID argument is provided by the caller. In one embodiment, the source code location ID argument is generated by logging function 205 by inspecting the call stack.

The session ID is a unique identifier for the current global session. The current end-to-end session is a global session. In some embodiments, the session ID is a unique integer that starts at zero and is incremented for each additional session. For example, an end-to-end session includes all of the actions that a web service stack takes in response to a user clicking a button on a web browser. When a user clicks a button on a web browser, the browser sends a message to a web server, which may in-turn send further messages to other pieces of software, such as database servers. All of those messages would be associated with one end-to-end session. With minimal instrumentation, the software retains this end-to-end session information on every host of application program 130a-130n.

The log message text argument is human-readable text for the current log message. This text may encode multiple different parameters. For example, "Writing 100 bytes to port 1024 on remote host example.com." During offline analysis, someone skilled in the arts, such as a system administrator, can use information extraction technology to parse this human-readable text and extract relevant information.

In some embodiments, the log message may be a payload or data structure. Instead of a text string, the fourth argument may be, for example, a coded string using a variable number of bytes. For example, an application program can pass an integer, say the number 100, which would represent the string "Writing 100 bytes to port 1024 on remote host example.com."

In one embodiment, each of logging programs 150a-150n retains full information about the first three arguments and partial information about the fourth argument (e.g., log message text). Every time logging function 205 is invoked, the first three arguments are stored; however storage of the fourth argument is controlled by policy component 240, as discussed in greater detail in the following flowcharts.

Lossless compression buffer 210 can store many tuples (e.g., timestamp, session ID, source code location ID), which have been passed to logging function 205 and subsequently stored by logging function 205 in this buffer. Lossless compression buffer 210 is periodically drained by compressing its contents, losslessly, and transmitting the compressed data to computer device 120 for storage in data repository 140. I/O component 225 contains the requisite software to compress and transmit the compressed data.

Reservoirs 215 are fixed size buffers that are periodically emptied and whose contents are stored in data repository 140. If the amount of data directed to a reservoir of reservoirs 215 is less than the fixed size, the reservoir acts as a buffer. If the amount of data directed to a reservoir of reservoirs 215 exceeds the reservoir's fixed size, the reservoir uses lossy data compression to reduce the input data to the fixed size. In one embodiment, a reservoir of reservoirs 215 can achieve this data reduction by maintaining a fixed-size uniform random sample of the input data as known in the art. I/O component 225 contains the requisite software to transmit reservoir data to computer device 120. Specifically, reservoirs 215 contains several reservoirs: one targeted sessions reservoir and one reservoir for each row in location ID mapping table 245.

A targeted session reservoir contains log messages that logging program 150 retains according to the session ID hash threshold. The targeted sessions reservoir may be sized to retain a 100% sample. If the selected session IDs produce more log records than expected, the targeted sessions reservoir may fill up, resulting in a sample rate of less than 100%. Each reservoir for each row in location ID mapping table 245 holds a uniform random sample of the log records produced from the indicated source code location within the current time interval. Logging function 205 finds a match in location ID mapping table 245 and uses an associated pointer to the appropriate reservoir to store current log text.

Catch-all reservoir 220 is an optional reservoir for all location IDs that do not match any row in location ID mapping table 245. Some embodiments may not implement catch-all reservoir 220 if the location table is guaranteed to cover all source code locations.

I/O component 225 is software that periodically flushes local in-memory buffers and transmits their contents to computer device 120 to be stored in data repository 140. I/O component 225 is discussed in detail with regard to FIG. 4.

Aggregate statistics table 230 provides policy component 240 with information about the overall characteristics of the logging message traffic on the computer device. The exact information stored in aggregate statistics table 230 depends on the specific policy that policy component 240 implements. For example, policy component 240 may need information about the number of sessions created per second and the most common 100 location IDs.

Reservoir sizes table 235 stores the current amount of memory allocated to each reservoir. Policy component 240 periodically updates reservoir sizes table 235. I/O component 225 uses the values in reservoir sizes table 235 when allocating fresh reservoirs to replace reservoirs that have been transmitted to data repository 140.

Policy component 240 is software that periodically adjusts the sampling policy by regenerating the Session ID Hash Threshold, location ID mapping table 245, and reservoir sizes table 235, based on updated information stored in aggregate statistics table 230. For example, policy component 240 may awake every minute and regenerate those data structures that comprise the sampling policy, after which policy component 240 then is suspended for another minute. Together, Session ID Hash Threshold and location ID mapping table 245 describe whether to retain the full text of a given log record or to apply lossy compression to the text of the log record.

Session ID Hash Threshold is an integer value that defines a threshold on a hash of the session ID. Logging function 205 applies a hash function to each session ID. If the output of the hash function is below the Session ID Hash Threshold, the log message will be retained. The purpose of this threshold is to retain full log information about a cross-section of the sessions in the distributed system without incurring any additional communication overhead. The hash function is the same on every computer device of the distributed system, so sessions whose IDs hash to a low value will be captured throughout the system.

In general, there are many software implementations that would allow policy component 240 to fill the policy data structures with data. Two embodiments of the policy component 240 are a follows. In the first embodiment, information in aggregate statistics table 230 is used to compute the average number of sessions per time interval and the average session length. Based on these two averages and the fixed size of the Targeted Sessions Reservoir, a value of the Session ID Hash Threshold is chosen such that the expected number of log records from sessions whose session IDs hash to values below the threshold will exactly fill the Targeted Sessions Reservoir. In the second embodiment, information in aggregate statistics table 230 is used to identify the 100 most common source code location IDs and the total number of unique location IDs. The 100 equally-sized reservoirs are then allocated for these top 100 locations. A new location ID mapping table 245 is generated that maps the top 100 locations to these reservoirs, and the overall memory budget is split between these 100 reservoirs and the catch-all reservoir 220. The ratio between the size of catch-all reservoir 220 and the total size of the 100 other reservoirs is set such that the ratio is proportional to the number of unique location IDs.

Additionally, many variations of the above mentioned embodiments are possible. Three non-limiting examples are as follows. First, the size of the Targeted Sessions Reservoir may be changed dynamically based on observed log traffic patterns. For example, if the number of distinct location IDs in the log data stream increases, more space may be allocated to the reservoirs for individual location IDs and less to the Targeted Sessions Reservoir. Second, the amount of variance in the log data at each source code location may be monitored. One could measure this variance by tracking the number of distinct variants of the message text or by looking at numbers (e.g., the characters '0' through '9') that appear in the text of each log message. Larger reservoirs may then be allocated for the locations with higher variance. Third, real-time monitoring software may be used to identify anomalies in the overall operation of the distributed system. When the number of anomalies increases, a larger amount of memory may be allocated to the sampling reservoirs, so as to retain a larger fraction of the logging traffic.

The operation of flushing reservoirs 215 is triggered at fixed time intervals. The flushing operation goes through reservoirs 215 one at a time, emptying each in turn. For each reservoir in reservoirs 215, a new reservoir is created and logging output is redirected to the new reservoir. Second, the contents of the old reservoir are transmitted to computer device 120 to be stored in data repository 140.

Location ID mapping table 245 is a table that maps individual source code location IDs to sampling reservoirs. The purpose of this table is to retain a constant amount of information per time window about each source code location within the distributed system. Location ID mapping table 245 encodes the policy used to direct log records' individual locations to specific reservoirs. Location ID mapping table 245 is a lookup table. In some embodiments, each row in the table may map a set of location IDs (for example, all locations within a single component, or all locations that hash to a single value) to a sampling reservoir. Each entry in location ID mapping table 245 is either a single source code location or a pointer to a source code location. Each entry in location ID mapping table 245 maps source code locations to a particular sampling reservoir.

Figure 3:
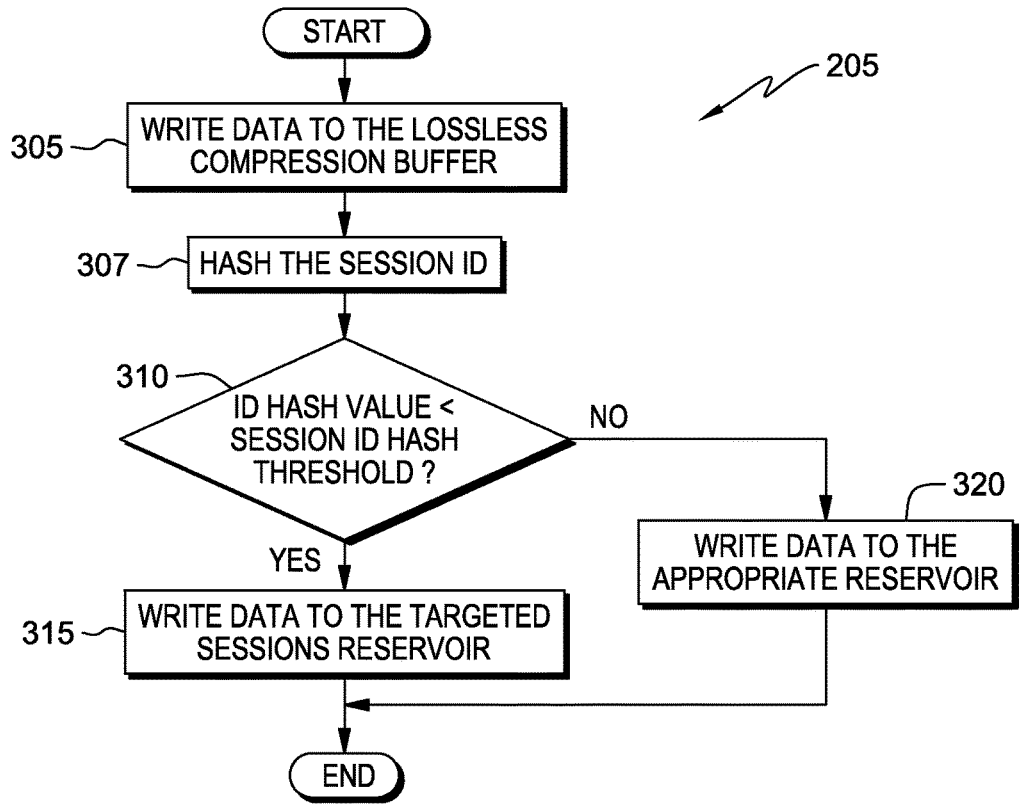
FIG. 3 is a flowchart depicting operational steps of the logging function of FIG. 2, in accordance with one embodiment of the present invention.

FIG. 3 is a flowchart depicting the steps of logging function 205, in accordance with one embodiment of the present invention. Each logging source calls its respective logging program (e.g., logging program 150a) to capture logging data. The logging program, such as logging program 150a, subsequently calls logging function 205. Logging function 205 stores a timestamp, a source code location ID, and a session ID. Logging function 205 may also store a log message text string or equivalent.

In step 305, logging function 205 writes data to lossless compression buffer 210, including the three arguments passed to logging function 205. The three arguments are a current real-time timestamp, a source code location ID, and a session ID.

In step 307, logging function 205 applies the session ID hash function to the session ID and determines an ID hash value. Hashing the session ID allows embodiments of the present invention to retain a cross-section of sessions without having to communicate information among computer devices 110a-110n. The session ID hash function maps a big number to a set of small numbers, as someone skilled in the arts will recognize. For example, possibly all numbers between 1,000 and 10,000 will be mapped to the number one. In one embodiment, only numbers that hash to the value of zero are kept, while all others are thrown away. In the depicted embodiment, a variable number of reservoirs exists which equals the session ID hash threshold, which approximates a uniform random sampling scheme.

In decision step 310, logging function 205 determines whether the hash value produced in step 307 is less than the session ID hash threshold (i.e., determines where to send the logging information). When the session ID hash function produces a value that is less than the session ID hash threshold, logging function 205 transitions to step 315 (decision step "YES" branch). When the session ID hash function produces a value that is greater than or equal to the session ID hash threshold, logging function 205 transitions to step 320 (decision step "NO" branch).

In step 315, logging function 205 retains the log message and sends the log message to the Targeted Sessions Reservoir.

In step 320, logging function 205 writes data to one of the other reservoirs. Based upon location id in location ID mapping table 245, the sampling reservoir is determined and logging function 205 sends the log message to the reservoir.

Figure 4:
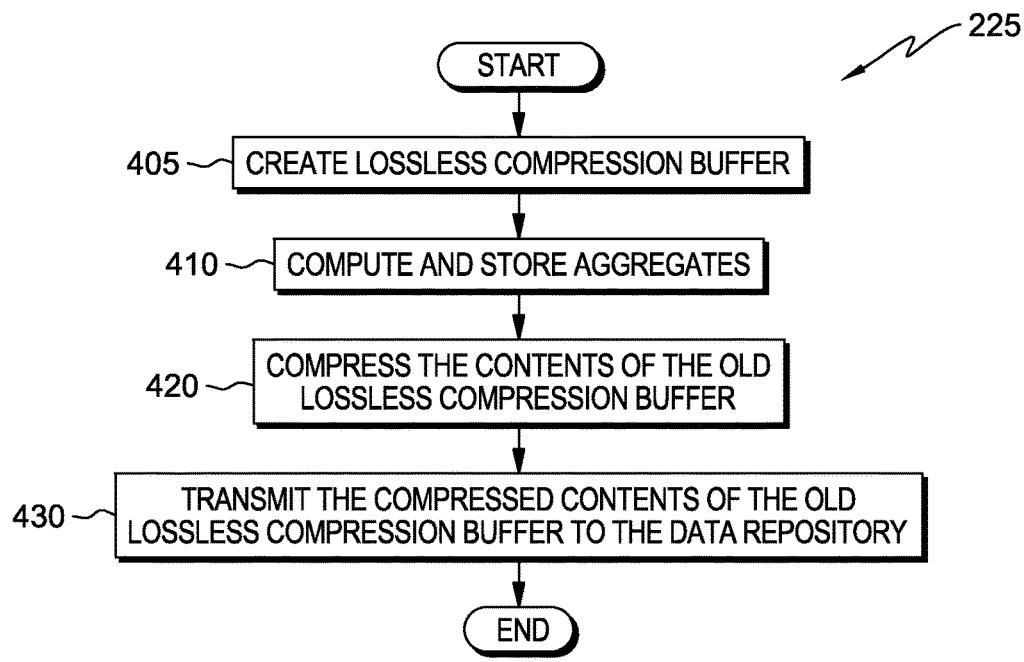
FIG. 4 is a flowchart depicting operational steps of the I/O component of FIG. 2, in accordance with one embodiment of the present invention.

FIG. 4 is a flowchart depicting operational steps of I/O component 225, in accordance with one embodiment of the present invention. Periodically, I/O component 225 awakes and flushes in-memory buffers, such as lossless compression buffer 210. I/O component 225 can remain suspended for one second to many minutes depending upon the rate that the buffers are flushed to persistent storage. In one embodiment, awaking is at a relatively frequent fixed time interval. Logging program 150a invokes I/O component 225 and I/O component 225 immediately suspends itself.

In step 405, I/O component 225 creates lossless compression buffer 210. After creating lossless compression buffer 210 I/O component 225 redirects logging output to the new buffer.

In step 410, I/O component 225 computes appropriate aggregates over the contents of the old lossless compression buffer and writes the aggregate information into aggregate statistics table 230.

In step 420, I/O component 225 compresses the contents of the old lossless compression buffer using lossless data compression techniques. One technique for compression is to first partition the records in the buffer by session ID and sort each partition by timestamp. Second, within each partition, the timestamps are encoded using delta encoding (that is, store the difference between adjacent timestamps, using as few bits as possible). Third, within each partition, the source code location IDs are encoded using Huffman coding, as someone skilled in the arts would recognize. Last, a separate table is created that maps the session ID to the partition ID.

In step 430, I/O component 225 transmits the compressed contents of the old lossless compression buffer to computer device 120 to be stored in data repository 140.

Figure 5:
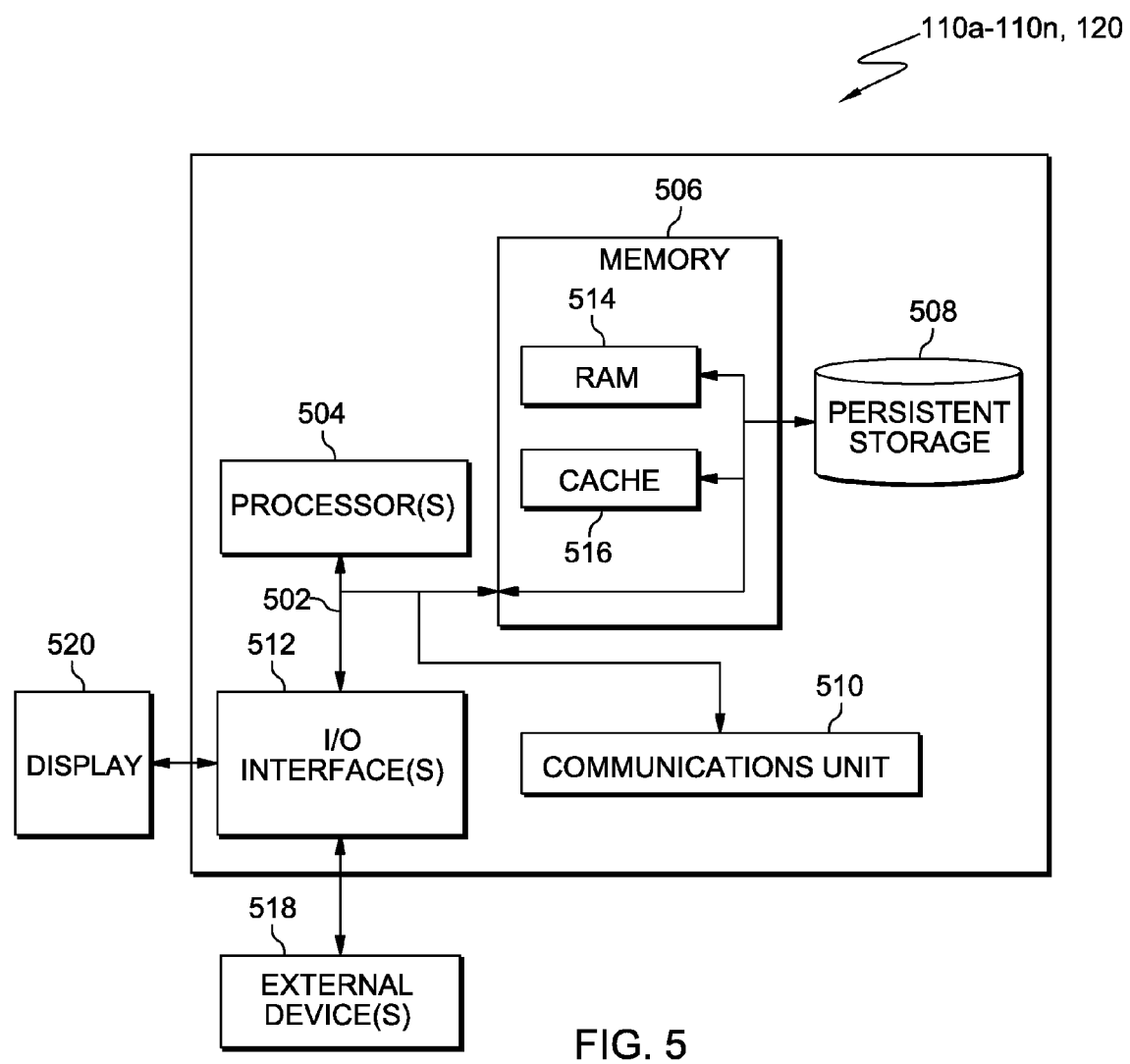
FIG. 5 depicts a block diagram of components of the computers of FIG. 1, in accordance with one embodiment of the present invention.

FIG. 5 depicts a block diagram of components of the computers of FIG. 1, in accordance with one embodiment of the present invention. It should be appreciated that FIG. 5 provides only an illustration of one implementation and does not imply any limitations with regard to the environments in which different embodiments may be implemented. Many modifications to the depicted environment may be made.

Computer devices 110a-110n and computer device 120 can each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Logging programs 150a-150n are stored in persistent storage 308, of computer devices 110a-110n, respectively, for execution and/or access by one or more of the respective computer processors 504 via one or more memories of memory 506. Data repository 140 is stored in persistent storage 508, of computer device 120, for execution and/or access by one or more of the respective computer processors 504 via one or more memories of memory 506.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 105 and other devices (not shown). In these examples, communications unit 510 includes one or more network interface cards. Communications unit 510 may provide communications through the use of either or both physical and wireless communications links.

Logging programs 150a-150n may be downloaded to persistent storage 508, of computer devices 110a-110n, respectively, through communications unit 510 of computer devices 110a-110n, respectively. Data repository 140 may be downloaded to persistent storage 508, of computer device 120, through communications unit 510 of computer device 120.

I/O interface(s) 512 allows for input and output of data with other devices that may be connected to computer devices 110a-110n and/or computer device 120. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., logging programs 150a-150n, can be stored on such portable computer readable storage media and can be loaded onto persistent storage 508, of computer devices 110a-110n, respectively, via I/O interface(s) 512 of computer devices 110a-110n, respectively. I/O interface(s) 512 also connects to display 520. Software and data used to practice embodiments of the present invention, e.g., data repository 140, can be stored on such portable computer readable storage media and can be loaded onto persistent storage 508, of computer device 120, via I/O interface(s) 512 of computer device 120. I/O interface(s) 512 also connects to display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for maximizing information content of logs, the method comprising the steps of:
   one or more processors receiving a first log message from an executing software program, wherein the executing software program is running on a distributed computing system, wherein the first log message includes a first timestamp, a first source code location ID, a first session ID, and a first log message text, and wherein the first session ID indicates that the first log message is associated with a first end-to-end session of a plurality of end-to-end sessions running on the distributed computing system;
   one or more processors storing the first timestamp, the first source code location ID, and the first session ID of the first log message in a first lossless buffer;
   one or more processors determining a hash function value of the first session ID;
   one or more processors determining that the hash function value of the first session ID is less than a hash value threshold, wherein the hash value threshold is set such that less than all end-to-end sessions of the plurality of end-to-end sessions running on the distributed computing system will have their log messages retained;
   in response to determining that the hash function value of the first session ID is less than the hash value threshold, one or more processors storing the first log message text in a session buffer, wherein the session buffer contains log message texts of all log messages with corresponding hash function values less than the hash value threshold;
   one or more processors creating a second lossless buffer;
   one or more processors redirecting logging output of the executing software program to the second lossless buffer from the first lossless buffer;
   one or more processors compressing content of the first lossless buffer;
   one or more processors transmitting the compressed content to a repository; and
   one or more processors causing the compressed content of the first lossless buffer to be stored in the repository, wherein the repository is a data storage node in which all log messages, compressed or uncompressed, are stored.

2. The method of claim 1, further comprising:
   one or more processors receiving a second log message from the executing software program, wherein the second log message includes a second timestamp, a second source code location ID, a second session ID, and a second log message text;
   one or more processors storing the second timestamp, the second source code location ID, and the second session ID of the second log message in the first lossless buffer;
   one or more processors determining a hash function value of the second session ID;
   one or more processors determining that the hash function value of the second session ID is greater than or equal to the hash value threshold; and
   in response to determining that the hash function value of the second session ID is greater than or equal to the hash value threshold, one or more processors storing the second log message text in a buffer corresponding to the second source code location ID.

3. The method of claim 1, further comprising:
   one or more processors accessing a table, wherein the table contains information about overall characteristics of log message traffic on the distributed computing system;
   one or more processors determining an average number of sessions occurring in a time interval and an average session length, based on the information contained in the table; and
   one or more processors determining the hash value threshold based on the average number of sessions occurring in the time interval and the average session length.

4. The method of claim 3, wherein the step of one or more processors determining the hash value threshold based on the average number of sessions occurring in the time interval and the average session length comprises:
   determining the hash value threshold based on the average number of sessions occurring in the time interval and the average session length such that an expected number of log message texts of all log messages with corresponding hash function values less than the hash value threshold will exactly fill the session buffer.

5. The method of claim 1, further comprising:
   one or more processors aggregating information about content of the first lossless buffer; and
   one or more processors writing the aggregate information into a table, wherein the table contains information about overall characteristics of log message traffic on the distributed computing system.

6. A computer program product for maximizing information content of logs, the computer program product comprising:
   one or more computer readable storage media and program instructions stored on the one or more computer readable storage media, the program instructions comprising:
   program instructions to receive a first log message from an executing software program, wherein the executing software program is running on a distributed computing system, wherein the first log message includes a first timestamp, a first source code location ID, a first session ID, and a first log message text, and wherein the first session ID indicates that the first log message is associated with a first end-to-end session of a plurality of end-to-end sessions running on the distributed computing system;

program instructions to store the first timestamp, the first source code location ID, and the first session ID of the first log message in a first lossless buffer;

program instructions to determine a hash function value of the first session ID;

program instructions to determine that the hash function value of the first session ID is less than a hash value threshold, wherein the hash value threshold is set such that less than all end-to-end sessions of the plurality of end-to-end sessions running on the distributed computing system will have their log messages retained;

program instructions to, in response to determining that the hash function value of the first session ID is less than the hash value threshold, store the first log message text in a session buffer, wherein the session buffer contains log message texts of all log messages with corresponding hash function values less than the hash value threshold;

program instructions to create a second lossless buffer;

program instructions to redirect logging output of the executing software program to the second lossless buffer from the first lossless buffer;

program instructions to compress content of the first lossless buffer;

program instructions to transmit the compressed content to a repository; and program instructions to cause the compressed content of the first lossless buffer to be stored in the repository, wherein the repository is a data storage node in which all log messages, compressed or uncompressed, are stored.

7. The computer program product of claim 6, further comprising program instructions, stored on the one or more computer readable storage media, to:

receive a second log message from the executing software program, wherein the second log message includes a second timestamp, a second source code location ID, a second session ID, and a second log message text;

store the second timestamp, the second source code location ID, and the second session ID of the second log message in the first lossless buffer;

determine a hash function value of the second session ID;

determine that the hash function value of the second session ID is greater than or equal to the hash value threshold; and store, in response to determining that the hash function value of the second session ID is greater than or equal to the hash value threshold, the second log message text in a buffer corresponding to the second source code location ID.

8. The computer program product of claim 6, further comprising program instructions, stored on the one or more computer readable storage media, to:

access a table, wherein the table contains information about overall characteristics of log message traffic on the distributed computing system;

determine an average number of sessions occurring in a time interval and an average session length, based on the information contained in the table; and determine the hash value threshold based on the average number of sessions occurring in the time interval and the average session length.

9. The computer program product of claim 6, further comprising program instructions, stored on the one or more computer readable storage media, to:

aggregate information about content of the first lossless buffer; and write the aggregate information into a table, wherein the table contains information about overall characteristics of log message traffic on the distributed computing system.

10. A computer system for maximizing information content of logs, the computer system comprising:

one or more computer processors, one or more computer readable storage media, and program instructions stored on the computer readable storage media for execution by at least one of the one or more processors, the program instructions comprising:

program instructions to receive a first log message from an executing software program, wherein the executing software program is running on a distributed computing system, wherein the first log message includes a first timestamp, a first source code location ID, a first session ID, and a first log message text, and wherein the first session ID indicates that the first log message is associated with a first end-to-end session of a plurality of end-to-end sessions running on the distributed computing system;

program instructions to store the first timestamp, the first source code location ID, and the first session ID of the first log message in a first lossless buffer;

program instructions to determine a hash function value of the first session ID;

program instructions to determine that the hash function value of the first session ID is less than a hash value threshold, wherein the hash value threshold is set such that less than all end-to-end sessions of the plurality of end-to-end sessions running on the distributed computing system will have their log messages retained;

program instructions to, in response to determining that the hash function value of the first session ID is less than the hash value threshold, store the first log message text in a session buffer, wherein the session buffer contains log message texts of all log messages with corresponding hash function values less than the hash value threshold;

program instructions to create a second lossless buffer;

program instructions to redirect logging output of the executing software program to the second lossless buffer from the first lossless buffer;

program instructions to compress content of the first lossless buffer;

program instructions to transmit the compressed content to a repository; and program instructions to cause the compressed content of the first lossless buffer to be stored in the repository, wherein the repository is a data storage node in which all log messages, compressed or uncompressed, are stored.

11. The computer system of claim 10, further comprising program instructions, stored on the one or more computer readable storage media for execution by at least one of the one or more processors, to:

receive a second log message from the executing software program, wherein the second log message includes a second timestamp, a second source code location ID, a second session ID, and a second log message text;

store the second timestamp, the second source code location ID, and the second session ID of the second log message in the first lossless buffer;

determine a hash function value of the second session ID;

determine that the hash function value of the second session ID is greater than or equal to the hash value threshold; and store, in response to determining that the hash function value of the second session ID is greater than or equal to the hash value threshold, the second log message text in a buffer corresponding to the second source code location ID.

12. The computer system of claim 10, further comprising program instructions, stored on the one or more computer readable storage media for execution by at least one of the one or more processors, to:

access a table, wherein the table contains information about overall characteristics of log message traffic on the distributed computing system;

determine an average number of sessions occurring in a time interval and an average session length, based on the information contained in the table; and determine the hash value threshold based on the average number of sessions occurring in the time interval and the average session length.

13. The computer system of claim 10, further comprising program instructions, stored on the one or more computer readable storage media for execution by at least one of the one or more processors, to:

aggregate information about content of the first lossless buffer; and write the aggregate information into a table, wherein the table contains information about overall characteristics of log message traffic on the distributed computing system.

* * * * *